United States Patent Office 3,219,646
Patented Nov. 23, 1965

3,219,646
POLYMERIZATION PROCESS AND CATALYST
Edward L. Czenkusch and Geir Bjornson, Bartlesville,
Okla., assignors to Phillips Petroleum Company, a corporation of Delaware
No Drawing. Filed Oct. 9, 1961, Ser. No. 143,592
16 Claims. (Cl. 260—93.7)

This invention relates to the catalytic polymerization of olefinic hydrocarbons to higher molecular weight products. In accordance with one aspect, this invention relates to an improved process for producing solid polymers of 1-olefins having at least 3 carbon atoms. In accordance with another aspect, this invention relates to a novel and improved catalyst adapted to promote the polymerization of 1-olefins, especially propylene, to solid polymers of increased isotatic content.

The production of normally solid polymers of 1-olefins by polymerization of such olefins in the presence of a catalyst comprising chromium oxide associated with at least one member of the group consisting of silica, alumina, zirconia and thoria, wherein at least part of the chromium is hexavalent, is known. This process produces thermoplastic polymers which can be molded to form objects of any desired shape or configuration, extruded and cold-drawn to form filaments, or fabricated to form film. The present invention relates to catalyst of the type described in the above-known process active for the polymerization of 1-olefins to solid polymers of increased isotactic content.

Accordingly, an object of this invention is to provide an improved solid catalyst active for the production of isotactic polymers.

Another object of this invention is to provide a process for preparing a supported chorimum oxide catalyst active for the production of isotactic polymers.

Another object of this invention is to provide nitrogen-containing compounds as agents for treating catalysts to increase their activity for the production of isotactic polymer.

Another object of this invention is to provide a process for converting 1-olefins, such as propylene, to solid polymers of increased isotactic content.

Other objects, aspects, as well as the several advantages of this invention will be apparent to those skilled in the art on a further study of this specification and the appended claims.

According to the invention, an improved catalyst is provided for the production of isotactic polymers by treating an active solid polymerization catalyst, for example a supported chromium oxide catalyst, capable of catalyzing the conversion of 1-olefins to solid polymer, with aromatic-substituted, nitrogen-containing compounds comprising hydrazines, azo compounds and amines. The resulting catalyst is characterized by increased selectivity for the conversion of 1-olefins having at least 3 carbon atoms to solid polymers of increased isotactic content.

The support employed in the above catalyst can comprise one or more members of the group consisting of silica (porous and nonporous forms), alumina, zirconia and thoria, and includes silica-alumina, silica-alumina-zirconia, silica-zirconia, acid-treated clays and similar complexes or composites known in the art as catalyst components. This class of materials is referred to herein as "support" for purposes of convenience. This term does not necessarily require that these materials be catalytically inert.

According to the invention, 1-olefins having at least 3 carbon atoms, especially propylene, can be polymerized to obtain a solid polymer of increased isotactic content by the use of a catalyst prepared in accordance with this invention as described herein. The polymerization preferably involves homopolymerization of 1-olefins and may be extended to copolymerization of 1-olefins with each other, such as the copolymerization of propylene with a higher 1-olefin. The preferred olefins that can be polymerized according to the invention are the aliphatic 1-olefins having from 3 to 8 carbon atoms per molecule, preferably those having from 3 to 6 carbon atoms per molecule, and no branching nearer the double bond than the 4-position, for example propylene, 1-butene, 1-pentene, 1-hexene, 4-methyl-1-pentene, 1-octene, and the like. If copolymerization is desired, the higher olefin is utilized in minor amounts as compared with the lower 1olefin and usually does not exceed about 25 weight percent of the total comonomeric feed mixture.

The catalyst of the invention can be prepared by depositing chromium oxide (e.g., $CrO_3$), or a chromium compound calcinable to chromium oxide (e.g., chromic nitrate, chromic sulfate, ammonium chromate, or chromium carbonate) on a support, for example, silica-alumina, and activating by heating at an elevated temperature to leave at least part of the chormium, preferably at least 0.1 weight percent based on total catalyst weight, in hexavalent form. This type of activation procedure is frequently conducted by heating the dried chromium oxide-silica-alumina composite at a temperature of approximately 450 to 1500° F. for a time generally ranging from 5 minutes to 20 hours or longer, preferably from 30 minutes to about 10 hours, in such an atmosphere that the chromium oxide is at least partially in the hexavalent state at the termination of the heating. It is ordinarily preferred that the heating be conducted in the presence of an oxygen-containing gas such as air. However, the atmosphere can be nitrogen or other inert gas. Alternatively, the heating can be effected in a vacuum. The total chromium content of the catalyst is generally in the range of 0.5 to 30 weight percent, preferably in the range of 15 to 25 weight percent, but can be outside the broad range if desired.

If desired, following the activation treatment described above, the activated catalyst can be subjected to treatment with a reducing agent such as carbon monoxide at a temperature ranging from about 400 to about 700° F. for a predetermined period of time sufficient to partially reduce the catalyst. For example, we have found that exposure of a chromium oxide catalyst, after activation, to a stream of gas comprising 42 percent carbon monoxide and 58 percent nitrogen for 17 minutes at a temperature of about 575° F. and at a carbon monoxide space rate of about 500 v./v./hr. resulted in a catalyst active for the polymerization of propylene to a solid polymer of high isotactic content.

In accordance with the present invention, an improved catalyst active for the polymerization of 1-olefins to solid polymer of increased isotactic content is obtained when, in conjunction with the aforementioned process steps, the activated catalyst is conditioned before polymerization by treatment with an aromatic-substituted, nitrogen-containing compound comprising hydrazine, azo compounds and amines. The aromatic-substituted, nitrogen-containing compounds that can be employed for treating the catalyst according to the invention are those compounds having a structural formula selected from

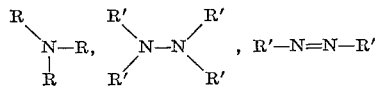

and

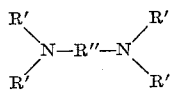

wherein N is nitrogen, R is selected from alkaryl and alkarylalkyl radicals having from 7 to 16, inclusive, carbon atoms, R' is an aromatic radical selected from aryl, alkaryl, arylalkyl and alkarylalkyl radicals having from 6 to 16, inclusive, carbon atoms, and R'' is selected from alkylene, cycloalkylene and arylene radicals having from 1 to 8, inclusive, carbon atoms. In the above formulas, the radicals can all be the same or different.

Representative examples of suitable compounds included within the scope of the above formulas that can be used according to the invention include:

tribenzylamine,
tri(3-phenylpropyl)amine,
tri(6-phenylhexyl)amine,
tri(p-isopropylbenzyl)amine,
tri[6-(p-butylphenyl)hexyl]amine,
N-(m-ethylbenzyl)dibenzylamine,
tetraphenylhydrazine,
tetranaphthylhydrazine,
tetra(3-propylphenyl)hydrazine,
tetra(m-octylphenyl)hydrazine,
tetra[4-(o-ethylphenyl)butyl]hydrazine,
N,N'-dibenzyl-N,N'-diphenylhydrazine,
azobenzene,
azotoluene,
1,1'-azonaphthalene,
p,p'-dibutylazobenzene,
3,3'-diphenylazopropane,
1-naphthaleneazobenzene,
N,N,N',N'-tetraphenylcyclopentylenediamine,
N,N,N',N'-tetrabenzylcyclohexylenediamine,
N,N,N',N'-tetraphenylmethylenediamine,
N,N,N',N'-tetrabenzylethylenediamine,
N,N,N',N'-tetraphenylpentamethylenediamine,
N,N'-dibenzyl-N,N'-diphenylhexamethylenediamine,
N,N,N',N'-tetraphenyloctamethylenediamine,
N,N'-dibenzyl-N,N'-diphenyl-p-phenylenediamine, and the like.

The concept that the above-described nitrogen compounds, i.e. nitrogenous compounds of large molecules containing a nitrogen atom with an unshared pair of electrons, are utilized as selective poisons or inactivating materials for the atactic polymer producing sites of catalysts rather than as promoters for the isotactic sites of catalysts is supported by the specific examples hereinbelow. The specific examples indicate that while the isotactic-to-atactic ratio is improved, the over-all polymerization rate is decreased. The solid isotactic polypropylene, for example, recovered as product from the present process exhibits physical properties which make it suitable for the fabrication of many useful objects. In the course of the experimental work, it was observed that the amount of selective nitrogenous reagent contacted with the catalyst could be used to control the molecular weight of the product. Greater usage of the nitrogenous reagent resulted in greater molecular weight as indicated by the higher values for inherent viscosity.

The nitrogen-containing selective reagents or treating materials of the invention are applied to the activated catalyst by simple blending or by impregnation using a suitable inert hydrocarbon solvent such as n-pentane, cyclohexane, benzene, etc., which is later removed, for example, by reduced pressure. If desired, the catalyst treating materials of the invention can be added to the polymerization reaction zone just prior to commencing the polymerization reaction. The amount of nitrogenous compound incorporated into the catalyst according to the invention will ordinarily range from about 0.001 to 0.50 mol of nitrogen compound per mol of chromium in the catalyst, preferably from about 0.04 to 0.3 mol of nitrogen compound per mol of chromium.

After the activated catalyst has been treated with a nitrogenous reagent in a solvent, in accordance with our invention, the excess solvent is preferably removed from contact with the catalyst. This can be accomplished by sweeping the excess solvent away with an inert gas or by placing the catalyst in a vacuum. The catalyst thus treated is maintained out of contact with the atmosphere and moisture until it is used in the polymerization, which is subsequently discussed herein.

The conditions of polymerization, such as temperature, pressure, etc., can be varied appreciably. For example, the temperature is generally in the range 100 to 500° F., preferably 150 to 375° F. When the 1-olefin of the class described contains from 3 to 6 carbon atoms per molecule, a more preferred polymerization temperature range is 150 to 250° F. The polymerization pressure employed can range from 0 to about 2000 p.s.i.g. The reaction time will ordinarily range from 0.1 minute to 10 hours, preferably from 0.5 to 5 hours. In a stirred reactor type of operation the catalyst concentration will generally range from about 1 to about 40 weight percent of the reaction mixture. In a fixed catalyst bed operation, the feed vapor space velocity will ordinarily range from about 10 to about 10,000 v./v./hour.

Although not absolutely necessary, it is generally preferred that the olefin be polymerized in diluted form. Suitable diluents include those hydrocarbons which are inert and not deleterious toward the catalyst under the polymerization conditions. Preferred diluents are the paraffinic and cycloparaffinic hydrocarbons, especially paraffinic hydrocarbons having from 3 to 12 carbon atoms per molecule and naphthenic hydrocarbons having from 5 to 12 carbon atoms per molecule. It is preferred that the diluent be liquid under the conditions of polymerization, a pressure sufficient to maintain the diluents substantially in the liquid phase is generally preferred. Alternatively, the polymerization can be conducted at relatively low pressures with the monomer totally in the gaseous phase. In addition, the process can be conducted with part of the monomer in the gaseous and part in the liquid phase or the process can be conducted with the monomer substantially undiluted in the liquid phase. The diluent, when used, is generally present in sufficient amounts so that the olefin concentration in the total hydrocarbon feed is of the order of 0.5 to 10 weight percent, although these limits are not absolute.

The catalyst contacting technique can be any of those well-known in the catalyst art. Thus, the reaction can be conducted by contacting the hydrocarbon feed with a fixed bed of catalyst, with a gravitating bed of catalyst, with a catalyst suspended in finely divided, particulate form in the diluent and being maintained in suspension by agitation, or by the use of a fluidized-bed technique. Whatever technique is used, the reaction can be carried out either in a batchwise or continuous manner.

At the completion of the reaction period, the polymers can be recovered from the reaction effluent by any suitable method, such as solvent extraction, precipitation, evaporation, etc. For example, after a suitable residence time in the polymerization zone, the reaction mixture is withdrawn from the reactor, unreacted monomer is removed, and the mixture substantially freed of monomer is filtered to remove the catalyst. After removal of the catalyst, the polymer can then be recovered from the filtrate by cooling to precipitate the polymer or any desired fraction thereof or by vaporization of the diluent. The total polymer can be fractionated to obtain fractions having different properties. Thus, the polymer can be extracted with boiling normal heptane or a similar solvent at atmospheric pressure and the insoluble fraction of the polymer isolated. This insoluble fraction, especially in the case of polypropylene, is crystalline and has a relatively high crystalline freeze point. This fraction is particularly useful for applications wherein a heat resistant thermoplastic is desired.

The polymers produced in accordance with this invention have utility in application where solid plastics are used. They can be molded to form articles of any desired shape such as bottles or other types of containers. Furthermore, they can be formed into sheets, film or pipe by extrusion or other suitable methods.

A better understanding of our invention will be obtained upon reference to the following illustrative examples which are not intended, however, to be unduly limitative of the invention.

EXAMPLE I

A series of polymerization runs was carried out for the polymerization of propylene over an activated chromium oxide catalyst supported on silica-alumina treated with tetraphenyl hydrazine (TPH) in which the quantity of tetraphenyl hydrazine was varied.

The chromia-silica-alumina catalyst was prepared by impregnating a quantity of microspheroidal 87:13 silica, alumina (approx. 70 microns) with an aqueous solution of $CrO_3$ such that the resulting catalytic mass contained 22 percent Cr. The mass was activated 18 hours at 950° F. in air. It was then treated with a gas containing 42 percent CO and 58 percent $N_2$ (CO space velocity of 492) for 17 minutes at 575° F.

The reactor charge in each case consisted of the stated quantity of activated chromia-silica-alumina, 227 grams cyclohexane, enough propylene to maintain a pressure of 450 p.s.i.g., and the desired quantity of tetraphenyl hydrazine. The reaction was carried out in a 1.4 liter stainless steel agitated reactor which was maintained at 220° F. and at 450 p.s.i.g. for 1 hour. At the completion of the reaction the reactor was vented and the contents were subjected to heating at a temperature of 212° F. for 5 hours in a vacuum oven to remove the cyclohexane and volatiles. The residue was dissolved in about 500 ml. of hot xylene and the hot solution was decanted to remove the settled-out catalyst. The solution was then cooled to room temperature to permit the isotactic polymer to crystallize. The slurry was filtered and washed with additional xylene. The solid polymer was dried, weighed, and subjected to viscosity determinations. The results of this series are set forth in Table I.

*Table I*

| Run No. | Mols TPH/ mol Cr | Polymerization rate, g./g. cat./hr. | Percent isotactic | Polymer* Inherent visc. |
|---|---|---|---|---|
| 1 (control) | 0.000 | 45.5 | 9.8 | 0.81 |
| 2 | 0.042 | 5.5 | 34.1 | 0.97 |
| 3 | 0.074 | 2.4 | 51.1 | 1.60 |
| 4 | 0.136 | 1.8 | 50.0 | 2.24 |

*Measured in decalin at 135° C.

EXAMPLE II

Another series of polymerization reactions utilizing substantially the same conditions as those of Example I was carried out except that a solution of $Cr(NO_3)_3 \cdot 9H_2O$ was used to impregnate the silica-alumina in order to obtain the 22 percent chromium content. The catalyst, after identical activation with air and CO, was treated with tetraphenyl hydrazine and then employed for the polymerization of propylene. The results are shown in Table II.

*Table II*

| Run No. | Mols TPH/ mol Cr | Polymerization rate, g./g. cat./hr. | Percent isotactic | Polymer Inherent visc. |
|---|---|---|---|---|
| 5 (control) | 0.000 | 73.4 | 5.5 | 0.85 |
| 6* | 0.039 | 13.3 | 22.3 | 1.58 |
| 7* | 0.072 | 4.6 | 43.2 | 1.44 |
| 8 | 0.146 | 3.4 | 51.8 | 1.63 |

*A four hour run.

EXAMPLE III

A series of propylene polymerization runs employing the same conditions as in Example I was carried out with a conditioned chromium oxide-silica-alumina catalyst except that selective catalyst treating agent used was tribenzylamine (TBA). The results are shown in Table III.

*Table III*

| Run No. | Mols TBA/ Mol Cr | Polymerization rate, g./g. cat./hr. | Percent isotactic |
|---|---|---|---|
| 9 (control) | 0.000 | 63.4 | 9.05 |
| 10 | 0.171 | 1.7 | 52.7 |
| 11 | 0.299 | 1.8 | 46.5 |

EXAMPLE IV

A series of propylene polymerization runs employing conditions substantially identical to that of Example I was carried out with a chromium oxide-silica, alumina catalyst activated with air @ 950° F. for 18 hours containing 2.5 percent chromium that had been treated with tetraphenyl hydrazine and tribenzylamine. The results of these runs are set forth below in Table IV.

*Table IV*

| Run No. | Mols treating agent/mol Cr | Rate, g./g./hr. | Percent isotactic |
|---|---|---|---|
| 12 (control) | 0.00 | 10.5 | 3.6 |
| 13 | 0.236 (tetraphenyl hydrazine) | 3.2 | 5.3 |
| 14 | 0.158 (tribenzylamine) | 3.8 | 5.3 |

It can be seen from Examples I–IV that the isotactic content of the polymer was materially increased when the catalyst was treated according to the invention.

EXAMPLE V

For comparison purposes, a series of propylene polymerization runs essentially identical to that of Example I was carried out with a chromium oxide-silica-alumina catalyst except a nonselective treating agent, triphenylamine (TPA), was used. The results are shown in Table V.

*Table V*

| Run No. | Mols TBA/ Mol Cr | Polymerization rate, g./g. cat./hr. | Percent isotactic |
|---|---|---|---|
| 15 (control) | 0.000 | 56.7 | 9.12 |
| 16 | 0.095 | 47.0 | 9.56 |
| 17 | 0.214 | 28.0 | 9.35 |

It can be seen from the above runs that the catalyst activity was appreciably reduced, but the isotactic content of the polymer was not increased.

The percent of isotactic polymer shown in the above examples was determined separating the entire batch of total polymer into the crystalline isotactic and the liquid atactic portion by the hot xylene procedure described in Example I. After the isotactic portion was isolated, the remaining xylene solutions were evaporated to determine the amount of residual atactic polymer. Comparison of the isotactic obtained to the total of isotactic and atactic obtained are the figures tabulated in the column labeled Percent Isotactic.

The inherent viscosity of the polymers in the preceding examples was determined as follows: A 0.01–0.10 g. sample was dissolved in 100 ml. decalin and adjusted to 135° C. Both the polypropylene solution and the decalin were passed through an Ostwald type viscosimeter at 135° C. and a measure of the viscosity of each was obtained in seconds. The relative viscosity was computed as follows:

$$\frac{\text{Solution time through viscosimeter (in seconds)}}{\text{Solvent time through viscosimeter (in seconds)}}$$
=relative viscosity From the relative viscosity, the inherent viscosity was computed as follows:

$$\frac{\text{Log relative viscosity} \times 2.303}{\text{Weight of original sample}} = \text{inherent viscosity}$$

It will be apparent to those skilled in the art that many variations and modifications of the invention can be practiced upon a study of the foregoing disclosure. Such variations and modifications are believed to come within the spirit and scope of the invention.

We claim:

1. In a process for the polymerization of 1-olefins having at least 3 carbon atoms to a solid polymer in the presence of a catalyst containing chromium oxide wherein at least a portion of said chromium is hexavalent, and recovering said solid polymer thus produced as product, the improvement wherein said catalyst is altered in activity so as to enhance the isotactic content of said polymer which comprises treating said catalyst prior to the polymerization with an aromatic-substituted nitrogen compound having a formula selected from the group consisting of

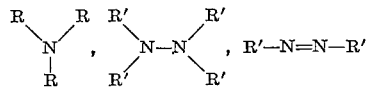

and

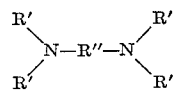

wherein N is nitrogen, R is selected from the group consisting of alkaryl and alkarylalkyl radicals having from 7 to 16, inclusive, carbon atoms, R' is an aromatic radical having from 6 to 16, inclusive, carbon atoms, and R" is selected from the group consisting of alkylene, cycloalkylene and arylene radicals having from 1 to 8, inclusive, carbon atoms.

2. A process according to claim 1 wherein said compound is tetraphenyl hydrazine.

3. A process according to claim 1 wherein said compound is tribenzylamine.

4. A polymerization process which comprises forming solid polymers of propylene at a temperature in the range 100 to 500° F. by contacting propylene and mixtures of propylene and higher 1-olefins with a catalyst comprising chromium oxide supported on at least one member of the group consisting of silica, alumina, zirconia and thoria, and wherein at least part of the chorium is hexavalent, said catalyst having been altered in activity so as to enhance the isotactic content of said polymer by contacting said catalyst prior to polymerization with a nitrogen compound having a formula selected from the group consisting of

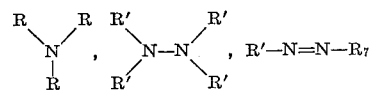

and

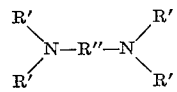

wherein N is nitrogen, R is selected from the group consisting of alkaryl and alkarylalkyl radicals having from 7 to 16, inclusive, carbon atoms, R' is an aromatic radical having from 6 to 16, inclusive, carbon atoms, and R" is selected from the group consisting of alkylene, cycloalkylene and arylene radicals having from 1 to 8, inclusive carbon atoms.

5. A process according to claim 4 wherein said compound is tetraphenyl hydrazine.

6. A process according to claim 4 wherein said compound is tribenzyl amine.

7. A process according to claim 4 wherein said catalyst is treated with carbon monoxide prior to polymerization to partially reduce said catalyst.

8. A process according to claim 4 wherein from 0.001 to 0.50 mol of said compound is incorporated into said catalyst per mol of chromium in the catalyst.

9. In a process for the preparation of a catalyst by depositing chromium oxide upon at least one member of the group consisting of silica, alumina, zirconia and thoria as a support, at least part of the chromium in the finished catalyst being hexavalent, and activating by heating at an elevated temperature, the improvement which comprises treating said catalyst after activation with a compound having a formula selected from the group consisting of

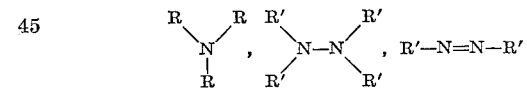

and

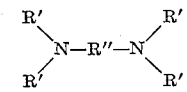

wherein N is nitrogen, R is selected from the group consisting of alkaryl and alkarylalkyl radicals having from 7 to 16, inclusive, carbon atoms, R' is an aromatic radical having from 6 to 16, inclusive, carbon atoms, and R" is selected from the group consisting of alkylene, cycloalkylene and arylene radicals having from 1 to 8, inclusive, carbon atoms, wherein from 0.001 to 0.50 mol of said compound is incorporated into said catalyst per mol of chromium therein.

10. A process according to claim 9 wherein said catalyst is also treated with carbon monoxide after activation to partially reduce the catalyst.

11. A process according to claim 9 wherein said compound is tetraphenylhydrazine.

12. A process according to claim 9 wherein said compound is tribenzyl amine.

13. A catalyst composition which forms on mixing materials comprising (1) chromium oxide deposited upon at least one member of the group consisting of silica, alumina, zirconia and thoria, at least a part of the chromium being hexavalent; and (2) a compound having a formula selected from the group consisting of

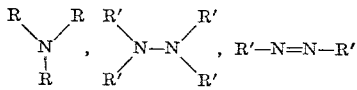

and

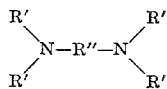

wherein N is notrogen, R is selected from the group consisting of alkaryl and alkarylalkyl radicals having from 7 to 16, inclusive, carbon atoms, R' is an aromatic radical having from 6 to 16, inclusive, carbon atoms, and R" is selected from the group consisting of alkylene, cycloalkylene and arylene radicals having from 1 to 8, inclusive, carbon atoms; component (2) being present in the range of 0.001 to 0.50 mol per mol of chromium in component (1).

14. A catalyst composition which forms on mixing material comprising (1) chromium oxide deposited upon at least one member of a group consisting of a silica, alumina, zirconia and thoria, at least a part of the chromium being hexavalent, said material being activated by heating at an elevated temperature; and (2) a compound having a formula selected from the group consisting of

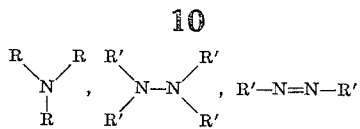

and

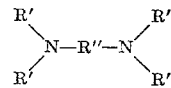

wherein N is nitrogen, R is selected from the group consisting of alkaryl and alkarylalkyl radicals having from 7 to 16, inclusive, carbon atoms, R' is an aromatic radical having from 6 to 16, inclusive, carbon atoms, and R" is selected from the group consisting of alkylene, cycloalkylene and arylene radicals having from 1 to 8, inclusive, carbon atoms; component (2) being present in the range of 0.001 to 0.50 mol per mol of chromium.

15. The catalyst composition of claim 14 wherein said component (1) is chromium oxide on silica-alumina and component (2) is tetraphenyl hydrazine.

16. The catalyst composition of claim 14 wherein said component (1) is chromium oxide on silica-alumina and component (2) is tetrabenzylamine.

References Cited by the Examiner
UNITED STATES PATENTS

| | | | |
|---|---|---|---|
| 3,037,008 | 5/1962 | Garetson et al. | 260—94.9 |
| 3,055,878 | 9/1962 | Janoski | 260—94.9 |

FOREIGN PATENTS

| | | |
|---|---|---|
| 622,775 | 6/1961 | Canada. |

JOSEPH L. SCHOFER, *Primary Examiner.*

UNITED STATES PATENT OFFICE
CERTIFICATE OF CORRECTION

Patent No. 3,219,646                        November 23, 1965

Edward L. Czenkusch et al.

It is hereby certified that error appears in the above numbered patent requiring correction and that the said Letters Patent should read as corrected below.

Column 7, line 67, after "forming" insert -- normally --; line 73, for "chorium" read -- chromium --; column 8, line 7, for "R′-N=N-$R_7$" read -- R′-N=N-R′ --.

Signed and sealed this 13th day of December 1966.

(SEAL)
Attest:

ERNEST W. SWIDER
Attesting Officer

EDWARD J. BRENNER
Commissioner of Patents